US012683713B2

(12) United States Patent
Yan et al.

(10) Patent No.: US 12,683,713 B2
(45) Date of Patent: Jul. 14, 2026

(54) SEGMENTED TRANSMISSION IN NTN IoT

(71) Applicant: Lenovo (Beijing) Limited, Beijing (CN)

(72) Inventors: Zhi Yan, Beijing (CN); Hongmei Liu, Beijing (CN); Yuantao Zhang, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 295 days.

(21) Appl. No.: 18/578,127

(22) PCT Filed: Jul. 23, 2021

(86) PCT No.: PCT/CN2021/108125

§ 371 (c)(1),
(2) Date: Jan. 10, 2024

(87) PCT Pub. No.: WO2023/000299

PCT Pub. Date: Jan. 26, 2023

(65) Prior Publication Data

US 2024/0322946 A1      Sep. 26, 2024

(51) Int. Cl.
| | |
|---|---|
| *H04L 1/00* | (2006.01) |
| *H04W 72/0446* | (2023.01) |
| *H04W 72/1268* | (2023.01) |
| *H04W 84/06* | (2009.01) |

(52) U.S. Cl.
CPC ....... *H04L 1/0068* (2013.01); *H04W 72/0446* (2013.01); *H04W 72/1268* (2013.01); *H04W 84/06* (2013.01)

(58) Field of Classification Search
CPC ............ H04L 1/0068; H04W 72/0446; H04W 72/1268; H04W 84/06
See application file for complete search history.

(56) References Cited

U.S. PATENT DOCUMENTS

| | | | |
|---|---|---|---|
| 12,401,453 B2 * | 8/2025 | Talarico | H04L 1/1664 |
| 2017/0202008 A1 * | 7/2017 | Nader | H04L 1/1887 |
| 2018/0270815 A1 * | 9/2018 | Bala | H04J 3/1694 |
| 2019/0158261 A1 * | 5/2019 | Hwang | H04L 5/14 |
| 2020/0236524 A1 | 7/2020 | Ye et al. | |

(Continued)

FOREIGN PATENT DOCUMENTS

| | | |
|---|---|---|
| CN | 106992847 A | 7/2017 |
| CN | 107637118 A | 1/2018 |

(Continued)

OTHER PUBLICATIONS

PCT/CN2021/108125 , "International Preliminary Report on Patentability", PCT Application No. PCT/CN2021/108125, Feb. 1, 2024, 4 pages.

(Continued)

*Primary Examiner* — Khai M Nguyen
(74) *Attorney, Agent, or Firm* — FIG. 1 Patents

(57) ABSTRACT

Methods and apparatuses for segmented transmission in NTN IoT are disclosed. A method comprises transmitting uplink data on a physical resource, wherein, at least a gap with a first length duration is inserted in the physical resource so that the uplink data is postponed to be transmitted after the gap, or at least a data segment of the uplink data with a second length duration is punctured.

20 Claims, 6 Drawing Sheets

(56) References Cited

U.S. PATENT DOCUMENTS

| | | | | |
|---|---|---|---|---|
| 2020/0336251 A1* | 10/2020 | Chen | ......................... | H04L 5/10 |
| 2021/0266983 A1* | 8/2021 | Li | ......................... | H04W 72/21 |
| 2022/0322336 A1* | 10/2022 | Sridharan | ............ | H04L 5/0053 |
| 2023/0254105 A1* | 8/2023 | Wong | ................... | H04L 5/0053 |
| | | | | 370/281 |

FOREIGN PATENT DOCUMENTS

| | | | |
|---|---|---|---|
| CN | 109923816 A | 6/2019 |
| WO | 2022077249 A1 | 4/2022 |
| WO | 2022183488 A1 | 9/2022 |

OTHER PUBLICATIONS

PCT/CN2021/108125 , "International Search Report and Written Opinion", PCT Application No. PCT/CN2021/108125, Apr. 22, 2022, 6 pages.

"Extended European Search Report", EP Application No. 21950548. 4, Feb. 27, 2025, 11 pages.

Lenovo, et al., "Time and frequency synchronization for IoT NTN", 3GPP TSG RAN WG1 Meeting #105, R1-2105624, e-Meeting, May 10-May 27, 2021. [Retrieved from the Internet] <https://ftp. 3gpp.org/tsg_ran/WG1_RL 1/TSGR1_105-e/Docs/R1-2105624.zip R1-2105624.docx>, May 2021, 4 pages.

\* cited by examiner $$X = \alpha * Y_{CH}$$

SEGMENTED TRANSMISSION IN NTN IoT

FIELD

The subject matter disclosed herein generally relates to wireless communications, and more particularly relates to methods and apparatuses for segmented transmission in NTN IoT.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/ Equipment (Mobile Terminal) (UE), non-terrestrial networks (NTN), terrestrial network (TN), timing advance (TA), Machine-Type Communication (MTC), enhanced MTC (eMTC), Internet-of-Things (IoT), Narrowband (NB), Narrowband Internet-of-Things (NB-IoT or NBIoT), Physical Uplink Shared Channel (PUSCH), NB-IoT PUSCH (NB-PUSCH, NPUSCH), Acknowledgment (ACK), Negative Acknowledgment (NACK), Demodulation Reference Signal (DMRS), timing advance (TA), timing offset (TO), Downlink control information (DCI), Random Access Channel (RACH), Physical Random Access Channel (PRACH), NB-IoT PRACH (NB-PRACH, NPRACH), uplink compensation gap (UCG), MTC PDCCH (MPDCCH), redundancy version (RV), transport block (TB), Low Earth Orbit (LEO), Geostationary earth orbit (GEO), Cyclic Prefix (CP), Frequency Division Duplex (FDD), Time Division Duplex (TDD), Hybrid Automatic Repeat reQuest (HARQ), system information block (SIB).

For NBIoT, NPUSCH has format 1 and format 2. NPUSCH format 1 is used for uplink data transmission. Two types of subcarrier spacing (Δf) are supported for NPUSCH format 1. For subcarrier spacing of 3.75 kHz in NPUSCH format 1, only single carrier (or single tone) is supported; for subcarrier spacing of 15 kHz in NPUSCH format 1, single tone, 3-tone, 6-tone and 12-tone are supported. NPUSCH format 2 is used for ACK/NACK feedback for downlink data. Two types of subcarrier spacing are also supported for NPUSCH format 2. For subcarrier spacing of each of 3.75 kHz and 15 kHz in NPUSCH format 2, only single tone is supported.

The below Table 1 shows the supported combinations of Δf, $$N_{sc}^{RU}, N_{slots}^{UL}$$

and $$N_{symb}^{UL}$$

for frame structure type 1.

TABLE 1

Supported combinations of $N_{sc}^{RU}$, $N_{slots}^{UL}$, and $N_{symb}^{UL}$ for frame structure type 1.

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 (32 ms) | 7 |
| | 15 kHz | 1 | 16 (8 ms) | |
| | | 3 | 8 (4 ms) | |
| | | 6 | 4 (2 ms) | |
| | | 12 | 2 (1 ms) | |
| 2 | 3.75 kHz | 1 | 4 (8 ms) | |
| | 15 kHz | 1 | 4 (2 ms) | |

In the above Table, Δf is subcarrier spacing;

$$N_{sc}^{RU}$$

is the number of tones for one resource unit;

$$N_{slots}^{UL}$$

is the number of slots for each resource unit; and $$N_{symb}^{UL}$$

is the number of symbols in one slot.

FIG. 1 illustrates some examples of NBIoT uplink structures in NPUSCH format 1 and NPUSCH format 2. In particular, for NPUSCH format 1, single tone $$(N_{sc}^{RU} = 1)$$

for subcarrier spacing of 15 kHz and 3-tone $$(N_{sc}^{RU} = 3)$$

for subcarrier spacing of 15 kHz are shown; and for NPUSCH format 2, subcarrier spacing of 3.75 kHz and subcarrier spacing of 15 kHz are shown.

Slot (NB slot) is the basic unit for NPUSCH transmission. Data (along with DMRS) in an NB slot should try to adopt the same frequency and the same TA to facilitate the decoding with same channel estimation. For example, for subcarrier spacing of 3.75 kHz, 1 NB slot is 2 ms; while for subcarrier spacing of 15 kHz, 1 NB slot is 0.5 ms.

FIG. 2 illustrates NBIoT uplink structure with DMRS for one NB slot being 2 ms with subcarrier spacing of 3.75 kHz. For NPUSCH format 1, DMRS (denoted as "RS" in FIG. 2) is transmitted in symbol #4 in each 2 ms NB slot. For NPUSCH format 2, DMRS (denoted as "RS" in FIG. 2) is transmitted in symbols #0, #1 and #2 in each 2 ms NB slot.

For NPUSCH transmission, resource units are used to describe the mapping of the NPUSCH transmission to resource elements. Each NPUSCH codeword can be mapped to one or multiple resource units $N_{RU}$, each of which shall be transmitted $N_{rep}$ times. $N_{RU}$ can be configured up to 10 while $N_{rep}$ can be configured up to 128 for NPUSCH format 1

Table 2 indicates the number of resource units ($N_{RU}$) being determined by the resource assignment ($I_{RU}$) for NPUSCH transmission. The resource assignment ($I_{RU}$) is indicated with 3 bits by the corresponding control signal (e.g., DCI format N0).

TABLE 2

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 3 indicates the repetition number ($N_{Rep}$) being determined by repetition number index ($I_{Rep}$) for NPUSCH transmission. The repetition number index ($I_{Rep}$) for NPUSCH transmission is indicated with 3 bits by the corresponding control signal (e.g., DCI format N0).

TABLE 3

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

In scenario of converge enhancement for NB-IoT, a total duration of an NPUSCH transmission may span tens of seconds. Table 4 indicates the maximum total durations of NPUSCH transmissions. It can be seen that an NPUSCH transmission can span up to 40 s.

TABLE 4

| NPUSCH | | | | Total Duration |
|---|---|---|---|---|
| format | $\Delta f$ | $N_{sc}^{RU}$ | $N_{slots}^{UL}$ | $N_{Rep} = 128, N_{RU} = 10$(format 1) |
| 1 | 3.75 kHz | 1 | 16 | 2*16*10*128 = 40960 ms |
| | 15 kHz | 1 | 16 | 0.5*16*10*128 = 10240 ms |
| | | 3 | 8 | 0.5*8*10*128 = 5120 ms |
| | | 6 | 4 | 0.5*4*10*128 = 2560 ms |
| | | 12 | 2 | 0.5*2*10*128 = 1280ms |
| 2 | 3.75 kHz | 1 | 4 | 2*4*128 = 1024 ms |
| | 15 kHz | 1 | 4 | 0.5*4*128 = 256 ms |

For NTN network, the satellite (e.g., LEO, GEO, etc) is moving with high speed, the propagation delay and frequency between the satellite and UE are always changing. Suppose that the satellite orbital speed is 7.5 km/s at 600 km altitude and that a minimum elevation angle on earth is approximately 10 degrees, the maximum delay drift between the satellite and UE will be on the order of ±20 μs/s. For one NPUSCH transmission spanning up to 40 s, the delta propagation delay will change up to 0.8 ms (based on a delay drift of ±20 μs/s) from the beginning to the end of PUSCH transmission. If TA is not updated in an NPUSCH transmission (for example, spanning up to 40 s), the TA adopted in the beginning is not suitable in the middle (and at the end) of the NPUSCH transmission, because if the delta TA exceeds ±$T_0$ (e.g., CP/2) will destroy OFDM orthogonality.

In TR 36.763, segmented transmission is agreed for long UL transmission on PUSCH and PRACH.

As shown in FIG. 3, a transmission gap is inserted in every N uplink transmission durations. UE pre-compensation (including time adjustment and/or frequency adjustment) is done in these transmission gaps. UE pre-compensation can alternatively be done by puncturing symbols (i.e. not transmitting the overlapped symbol of the later slot due to time adjustment).

However, it is yet unknown how the N durations, transmission gap duration and puncturing period are configured. In addition, it is unknown how the N durations are counted? For example, it is unknown whether the N durations are counted based on valid subframe or absolute subframe. A valid subframe is a subframe configured for uplink transmission for a UE. An invalid subframe is a subframe not configured for the uplink transmission for the UE. The configuration of the valid subframes and the invalid subframes is contained in system information block (SIB) or in a higher layer signaling. In particular, the configuration of the valid subframes and the invalid subframes is a valid and invalid subframe pattern. Each bit of the pattern indicates one subframe being valid subframe or invalid subframe. For example, '1' indicates valid subframe while '0' indicates invalid subframe. For example, if the valid and invalid subframe pattern is "10001011" for subframes #0 to #7, subframes #0, #4, #6 and #7 are valid subframes for uplink transmission for a UE while subframes #1, #2, #3 and #5 are invalid subframes for the uplink transmission (i.e. the UE does not perform uplink transmission in subframes #1, #2, #3 and #5). An absolute subframe is a subframe no matter whether uplink transmission is performed therein. In other words, both valid subframe(s) and invalid subframe(s) are absolute subframes.

In NR Release 13, an uplink transmission gap is inserted in every N absolute subframes. DL synchronization is done in these transmission gaps. For example, during the transmission gaps, the UE may switch to the DL and perform time synchronization and/or frequency synchronization.

Uplink transmission gap is defined by a period $T_{UCG}$ (uplink compensation gap (UCG timer)) and a gap length $T_{gap}$. All uplink transmissions of duration greater than or equal to $T_{UCG}$ ms applies transmission gap with the gap length $T_{gap}$ and periodicity $T_{UCG}$ until the uplink transmission completes. The maximum UL transmission period $T_{UCG}$ depends on the drift of the output frequency of the UE's crystal oscillator, and is configured by higher layer, e.g. $T_{UCG}$=256 ms. As shown in FIG. 4, for NPUSCH, UCG timer $T_{UCG}$=256 ms, and $T_{gap}$=40 ms. For NPRACH, UCG timer $T_{UCG}$=64*(preamble duration), $T_{gap}$=40 ms.

If the transmission gap duration is counted with absolute subframes, the NB slot (=2 ms) may be segmented due to RACH resource or invalid subframe(s) configured by higher layer signaling. The channel estimation of segmented parts of the NB slot is different. So, NPUSCH performance of the NB slot will be affected if the NB slot is segmented.

FIG. 5 illustrates an example of segmented NB slot by the transmission gap. A first 1 ms of one NB slot (with 3.75 kHz subcarrier spacing) is in a first NPUSCH transmission of 256 ms. Due to the transmission gap of 40 ms, a last 1 ms of the one NB slot is in a second NPUSCH transmission of 256 ms.

For the transmission gap defined in NR Release 13, the transmission gap does not frequently exist since the periodicity $T_{UCG}$ (=256 ms) is much longer than 1 NB slot (=2 ms). Accordingly, the NPUSCH performance will not be affected seriously, especially for NPUSCH transmissions with large repetition number.

However, according to the analysis in PCT/CN2020/120780 filed by the same applicant with the same inventors as this application, for NTN transmission gap, TA should be updated considerably less than every 256 ms. To reserve initial TA error margin, X (corresponding to the above-described periodicity $T_{UCG}$) may be configured as 100 or 64 or 32 ms for a drift rate of ±20 μs/s.

When the periodicity $T_{UCG}$ of the transmission gap becomes shorter, more segmented NB slots would probably occur, which is undesirable.

FIG. 5 also illustrates that when there is configured NPRACH resource, the NPUSCH transmission is postponed. It means that the NPUSCH transmission cannot be overlapped with NPRACH transmission.

According to TS 36.211, for subcarrier spacing of 3.75 kHz, the NPUSCH transmission in overlapped 1 NB slot (2 ms) is postponed until the next 1 NB slots (2 ms) not overlapping with any configured NPRACH resource. FIG. 6 illustrates an example of the postponed NPUSCH transmission due to overlapping with NPRACH resource. It can be seen that, when available resource duration is smaller than one NB slot (i.e. 2 ms), the NPUSCH transmission is postponed to be transmitted in one NB slot that does not overlap with any configured NPRACH resource. In this manner, any NB slot is not segmented by NPRACH resource.

This invention proposes different solutions for segmented transmission in NTN IoT.

BRIEF SUMMARY

Methods and apparatuses for segmented transmission in NTN IoT are disclosed.

In one embodiment, a method comprises transmitting uplink data on a physical resource, wherein, at least a gap with a first length duration is inserted in the physical resource so that the uplink data is postponed to be transmitted after the gap, or at least a data segment of the uplink data with a second length duration is punctured. Alternatively, at least a gap is inserted in the physical resource and at least a data segment is punctured In one embodiment, the gap is inserted and/or the data segment is punctured after at least one of: a third length duration of continuous uplink data transmission; a length duration determined by slot unit duration and a fourth length duration (which can be minimum integer times of slot unit duration no smaller than the fourth length duration); a fifth length duration of uplink data transmission; a sixth number of slot unit duration; and a seventh repetition number of uplink data transmission. In some embodiment, the first length duration, the second length duration, the third length duration, the fourth length duration, the fifth length duration, the sixth number or the seventh repetition number is determined by at least one of: a time offset drift rate; an identical repetition number of uplink data; an NTN deployment scenario; and a frequency hopping interval and/or a scaling factor.

In another embodiment, a whole slot unit of the uplink data is postponed to be transmitted after the gap in the condition that the slot unit of the uplink data would be segmented by the gap. From another point of view, a whole slot unit of the uplink data is postponed to be transmitted after the gap in the condition that the starting transmission of the slot unit of the uplink data is in a last uplink subframe before the gap.

In some embodiment, a gap timer is associated with the first length duration, the gap timer restarts when uplink data restarts after any uplink data transmission suspending or after the gap.

In some embodiment, both time adjustment and frequency adjustment are performed in the gap. In some embodiment, time adjustment is performed in the data segment of the uplink data with the second length duration being punctured.

In another embodiment, a remote unit comprises a transmitter that transmits uplink data on a physical resource; and a processor that postpones the transmission of the uplink data by at least a gap with a first length duration or punctures at least a data segment of the uplink data with a second length duration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
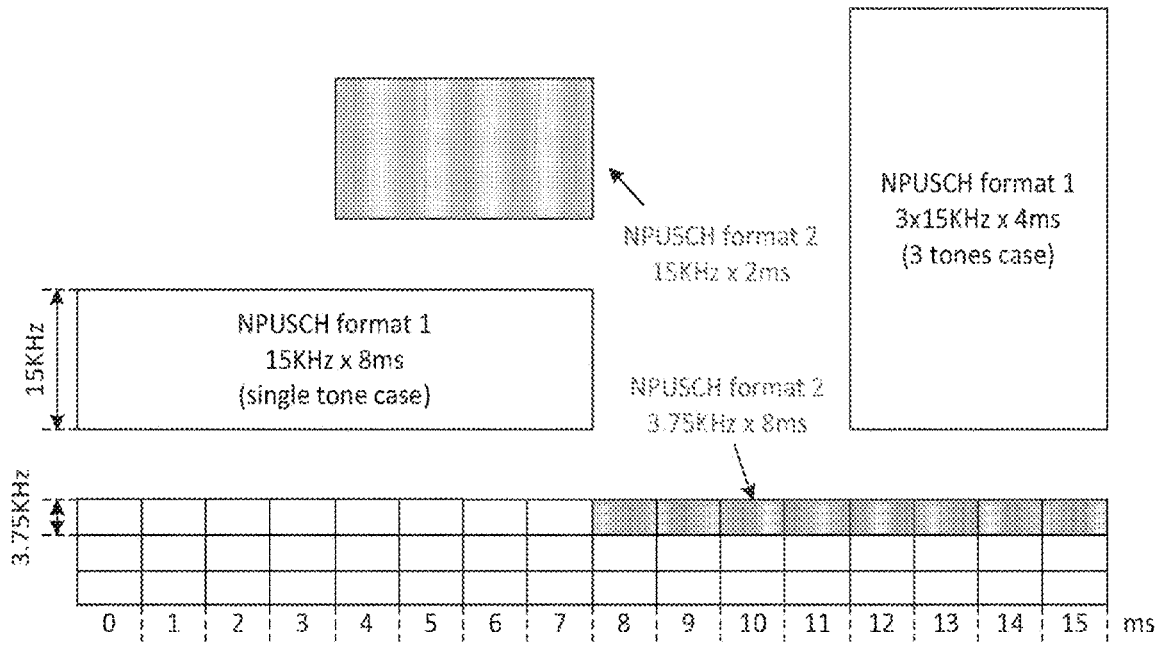
FIG. 1 illustrates some examples of NBIoT uplink structures in NPUSCH format 1 and NPUSCH format 2.
Figure 2:
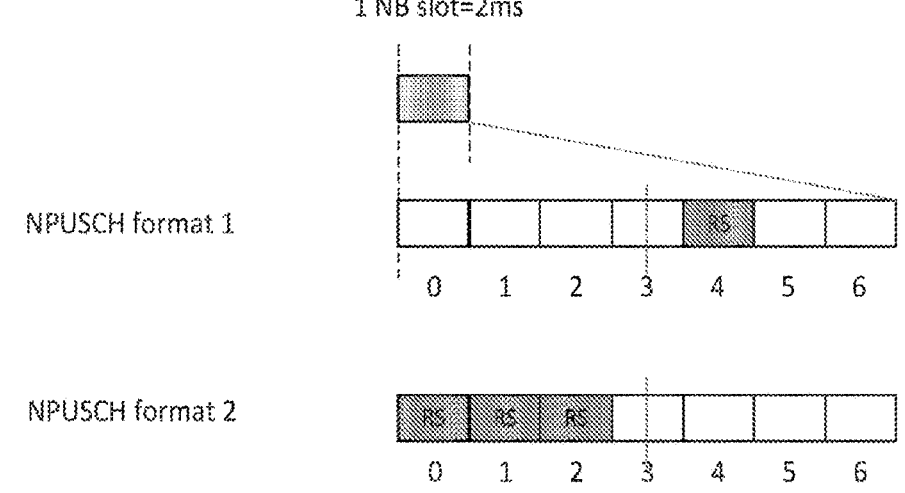
FIG. 2 illustrates NBIoT uplink structure with DMRS for one NB slot being 2 ms.
Figure 3:
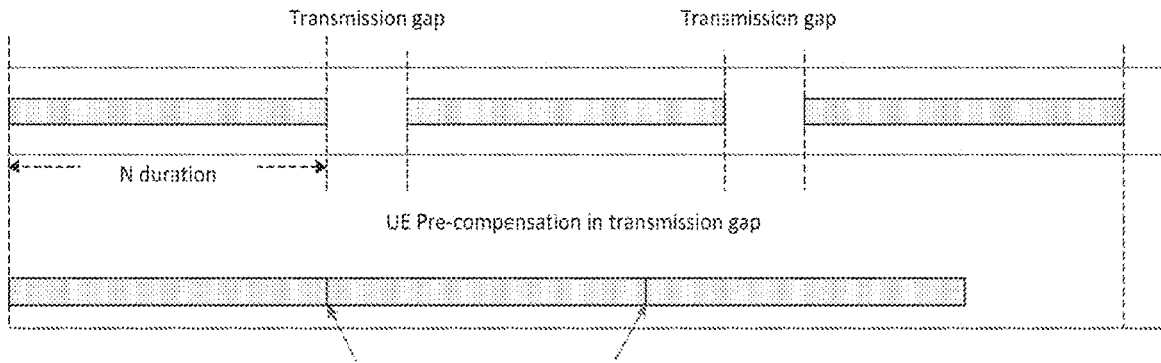
FIG. 3 illustrates a concept of segmented transmission.
Figure 4:
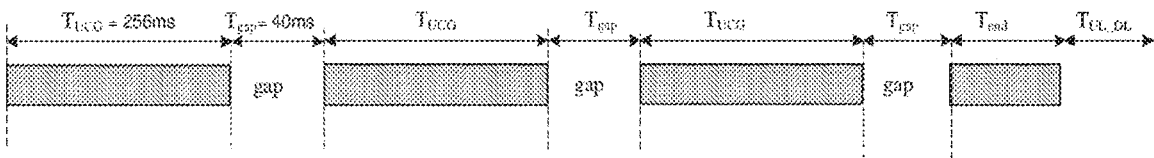
FIG. 4 illustrates uplink transmission gaps in NR Release 13.
Figure 5:
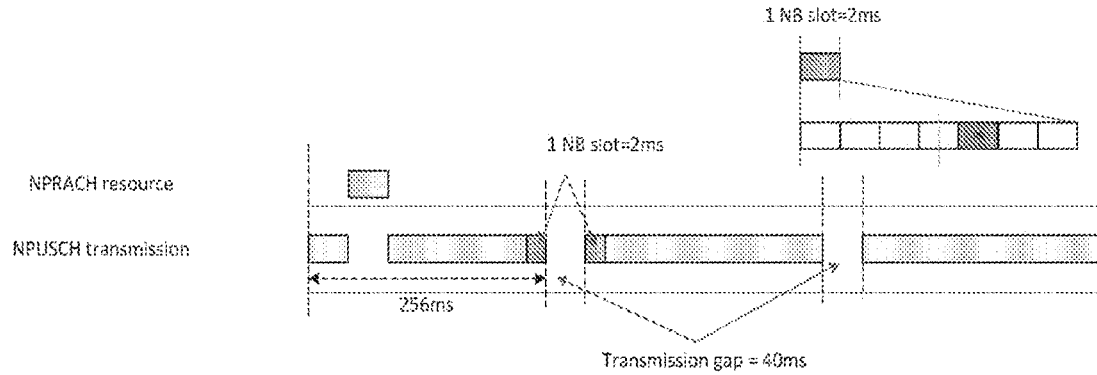
FIG. 5 illustrates an example of segmented NB slot by the transmission gap.
Figure 6:
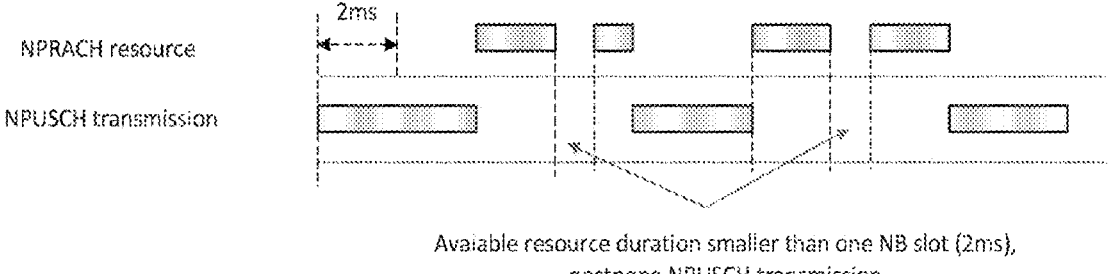
FIG. 6 illustrates an example of the postponed NPUSCH transmission due to overlapping with NPRACH resource.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

According to a first embodiment, for NPUSCH format 1 and NPUSCH format 2, after X continuous transmission, an NTN transmission gap of Y time duration is inserted, which means that the uplink transmission is postponed to be transmitted after the NTN transmission gap (Y).

In addition to the inserted NTN transmission gap (Y), the continuous transmission may become discontinuous due to other gaps, e.g., invalid subframe(s) configured by higher layer signaling and/or NPRACH resource, during which the uplink NPUSCH transmission is suspended. In other words, the gaps may be any of inserted NTN transmission gaps (Y), invalid subframe(s) and NPRACH resources according to the first embodiment. After each of the gaps, a timer restarts when uplink transmission restarts.

X is configured by higher layer so that NB slot will not be segmented for any subcarrier spacing (3.75 kHz or 15 kHz). For example, when the subcarrier spacing is 3.75 kHz and one NB slot is 2 ms, X can be configured as a multiple of 2 ms, e.g., any of 4 ms, 8 ms, 16 ms and 32 ms, so that any one NB slot of 2 ms is not segmented.

When the uplink transmission is suspended due to gaps (e.g., invalid subframe(s) configured by higher layer signaling, NPRACH resources, and inserted NTN transmission gaps), both time adjustment and frequency adjustment can be performed in these gaps. After each gap, a timer restarts when uplink transmission restarts. Accordingly, if the uplink transmission is not suspended by invalid subframe(s) and NPRACH resource, after X continuous transmission (which can be triggered by the timer), the uplink transmission is suspended. In other words, an NTN transmission gap can only be inserted when continuous uplink transmission is larger than X (i.e. the uplink transmission is not suspended by other gaps (invalid subframe(s) and NPRACH resource) for X).

For each continuous uplink transmission larger than X from the start or restart of the uplink transmission, a NTN transmission gap of Y time duration shall be inserted while the uplink transmission is postponed to be transmitted after the NTN transmission gap (Y).

Figure 7:
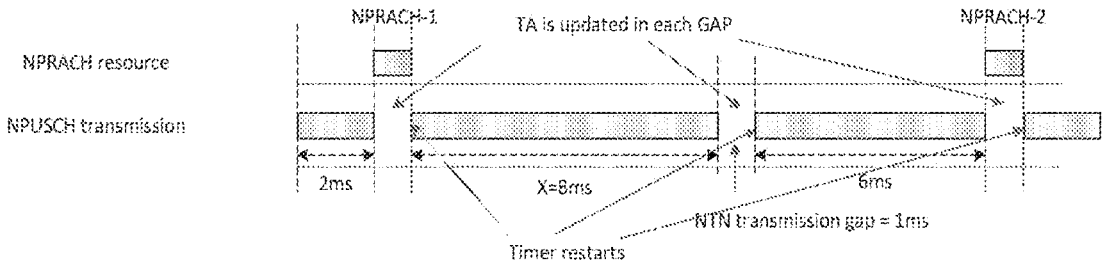
FIG. 7 illustrates an example of the first embodiment.

FIG. 7 illustrates an example of the first embodiment. In FIG. 7, NPRACH resource is shown as an example of other gaps. Invalid subframe(s) are not shown. X is configured as 8 ms, and Y (NTN transmission gap) is configured as 1 ms.

As shown in FIG. 7, from the start of the NPUSCH transmission, 2 ms elapses when a first NPRACH resource (NPRACH-1) forms a gap for the NPUSCH transmission. Timer restarts after NPRACH-1. When 8 ms elapses (during which no NPRACH resource or invalid subframe(s) exists), triggered by the timer, an NTN transmission gap (Y) of 1 ms is inserted, while the uplink transmission is postponed to be transmitted after the NTN transmission gap (Y). Timer restarts after the NTN transmission gap (Y). 6 ms elapses when a second NPRACH resource (NPRACH-2) forms a gap. Timer restarts after NPRACH-2. In each of the gaps (NPRACH-1, inserted NTN transmission gap, and NPRACH-2), time adjustment (e.g. TA update) is performed. Frequency adjustment can also be performed in each of the gaps.

According to the first embodiment, the UE can update the TA in any of the gaps (invalid subframe(s), NPRACH resource, NTN transmission gap). So, time adjustment and/or frequency adjustment may happen frequently, which leads to UE power waste. In addition, because the invalid subframes and/or NPRACH resource may be different for different UEs, different UEs may update TA in different subframes. However, the eNB cannot easily achieve the TA estimation without knowledge of information of time adjustment and/or frequency adjustment because the eNB cannot combine TA estimations from multiple subframes.

According to a second embodiment, after an X' transmission duration, an NTN transmission gap of Y time duration is inserted, which means that the uplink transmission is postponed to be transmitted after the NTN transmission gap (Y). The X' transmission duration is determined by NB slot unit duration and an X transmission duration that is predefined or configured by higher layer signaling. The NB slot unit duration is a duration of one NB slot (e.g. 2 ms for 3.75 kHz subcarrier spacing or 0.5 ms for 15 kHz subcarrier spacing). For example, X' transmission duration can be minimum integer times of NB slot unit duration no smaller than the X transmission duration. Obviously, integer times of NB slot unit duration can make sure that any NB slot will not be segmented.

On the other hand, since invalid subframe(s) and/or NPRACH resource are not counted in the integer times of NB slot unit duration, the absolute subframes (or absolute NB slots) for the integer times of NB slot unit duration are different depending on the number and/or the length(s) of the invalid subframe(s) and/or configured NPRACH resource(s) within the integer times of NB slot unit duration. Therefore, minimum integer times of NB slot unit duration no smaller than X transmission duration can be determined as X' transmission duration.

After each of the inserted NTN transmission gaps, a timer restarts when uplink transmission restarts.

According to the second embodiment, the time adjustment and/or frequency adjustment can be done only in the inserted NTN transmission gaps, that is, not in other gaps (e.g., invalid subframe(s) and/or configured NPRACH resource). Therefore, the eNB knows information of when time adjustment and/or frequency adjustment are made and accordingly easily achieves the TA estimation.

Figure 8:
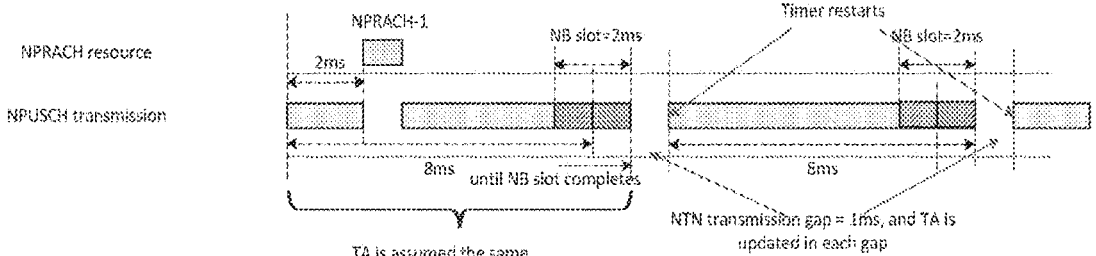
FIG. 8 illustrates an example of the second embodiment.

FIG. 8 illustrates an example of the second embodiment. In FIG. 8, NPRACH resource is shown as an example of other gaps. Invalid subframe(s) are not shown. X is configured as 8 ms, and Y (NTN transmission gap) is configured as 1 ms.

From the start of the NPUSCH transmission, 2 ms elapses when a first NPRACH resource (NPRACH-1) arrives. The NPUSCH transmission suspends during the NPRACH resource (NPRACH-1). However, time adjustment or frequency adjustment is not performed during the NPRACH resource. In other words, the timer does not restart after the NPRACH resource (NPRACH-1). When 8 ms (=X) elapses from the start of the NPUSCH transmission, one NB slot (=2 ms) does not transmit completely. Therefore, an NTN transmission gap (Y) is inserted after the completion of transmission of the one NB slot. In the minimum integer times of NB slot unit duration no smaller than X (=8 ms) transmission duration (i.e. in X' transmission duration), TA is assumed the same. Timer restarts after the NTN transmission gap (Y) (=1 ms). 8 ms elapses (when one NB slot (=2 ms) transmits completely) when another NTN transmission gap (Y) is inserted.

As a whole, according to the second embodiment, an NTN transmission gap (Y) is inserted every X' transmission duration that is determined by NB slot unit duration and an X transmission duration (which is predefined or configured by higher layer signaling), e.g. the minimum integer times of NB slot unit duration no smaller than X transmission duration (where an NB slot transmission completes at the end of X' transmission duration). X' can be the same as X, or larger than X.

According to a third embodiment, after X transmission time duration, an NTN transmission gap of Y time duration is inserted, which means that the uplink transmission is postponed to be transmitted after the NTN transmission gap (Y). In addition, if a mapping to one NB slot would be segmented by the NTN transmission gap (Y), the whole NPUSCH transmission of the one NB slot is postponed to be transmitted after the NTN transmission gap (Y). In other words, if the starting transmission of one NB slot for NPUSCH transmission would be in the last uplink subframe before the NTN transmission gap (Y), the whole of the one NB slot for NPUSCH transmission is postponed to be transmitted after the NTN transmission gap (Y).

Figure 9:
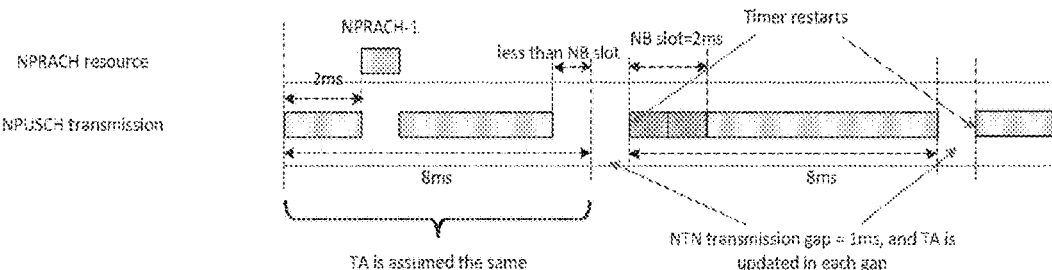
FIG. 9 illustrates an example of the third embodiment.

FIG. 9 illustrates an example of the third embodiment. In FIG. 9, NPRACH resource is shown as an example of other gaps. Invalid subframe(s) are not shown. X is configured as 8 ms, and Y (NTN transmission gap) is configured as 1 ms.

From the start of the NPUSCH transmission, 2 ms elapses when a first NPRACH resource (NPRACH-1) arrives. The NPUSCH transmission suspends during the NPRACH resource (NPRACH-1). However, time adjustment or frequency adjustment is not performed during the NPRACH resource. In other words, the timer does not restart after the NPRACH resource (NPRACH-1). When 8 ms (=X) elapses from the start of the NPUSCH transmission, one NB slot (=2 ms) would not transmit completely. Therefore, an NTN transmission gap (Y) is inserted after 8 ms (=X) while a last NB slot that would not transmit completely before the 8 ms will be transmitted after the NTN transmission gap (Y) (=1 ms). In other words, if the last NB slot would start from the last subframe before the NTN transmission gap (Y), a whole of the last NB slot would be transmitted after the NTN transmission gap (Y). Timer restarts after the NTN transmission gap (Y). 8 ms elapses when another NTN transmission gap (Y) is inserted.

As a whole, according to the third embodiment, an NTN transmission gap (Y) is inserted every X transmission duration, and if one NB slot would be segmented by the NTN transmission gap (or if one NB slot would start from the last subframe before the NTN transmission gap), the whole of the one NB slot is postponed to be transmitted after the NTN transmission gap (Y). The postponement of the NPUSCH transmission due to insertion of the NTN transmission gap (Y) has the same design concept as that of the postponement of the PUSCH transmission due to its overlapping with RACH resource.

The disadvantage of the third embodiment may be resource waste due to transmission postponement.

According to a fourth embodiment, after X valid time slot transmission, an NTN transmission gap of Y time duration is inserted, which means that the following uplink transmission is postponed to be transmitted after the NTN transmission gap (Y). The time adjustment and/or frequency adjustment are performed in the NTN transmission gap (Y).

The NPUSCH transmission is only performed in valid time slot which is not occupied by NPRACH resource. So, the X valid time slot transmission can be counted on the basis of the number of NB slots. For example, if one NB slot is 2 ms and the number of NB slots is 4, X=2 ms*4=8 ms.

According to a fifth embodiment, after X repetition number of uplink NPUSCH transmissions, an NTN transmission gap of Y time duration is inserted, which means that the subsequent repetitions of the NPUSCH transmissions are postponed to be transmitted after the NTN transmission gap (Y). The time adjustment and/or frequency adjustment are performed in the NTN transmission gap (Y).

Each NPUSCH transmission can be transmitted $N_{rep}$ times. After X repetitions of NPUSCH transmissions (i.e. the NPUSCH transmission has been transmitted X times), an NTN transmission gap of Y time duration can be inserted. For example, if an NPUSCH transmission is to be transmitted 128 times, after X=8 times of NPUSCH transmissions, an NTN transmission gap (Y) is inserted before transmitting the next 8 times of NPUSCH transmissions, and etc.

In the above-described first to fifth embodiments, when an NTN transmission gap of Y time duration is inserted, the uplink transmission is postponed to be transmitted after the NTN transmission gap (Y). According to a sixth embodiment, the insertion of the NTN transmission gap (Y) can be replaced by a Y' time duration of uplink transmission being punctured, which means that Y' time duration of uplink transmission is dropped. During the Y' time duration of uplink transmission being punctured, the time adjustment (e.g. TA update) is performed, while the frequency adjustment is not performed.

Assuming that the eNB knows the time adjustment (e.g. TA update) value, when the uplink NPUSCH transmissions in NB-IoT uplink slot n and NB-IoT uplink slot n+1 are overlapped due to the time adjustment, the UE shall complete transmission of NB-IoT uplink slot n and not transmit the overlapped part of NB-IoT uplink slot n+1. That is, the Y' time duration of uplink transmission being punctured is the overlapped part of NB-IoT uplink slot n+1.

Assuming that the eNB doesn't know the time adjustment (e.g. TA update) value, when the uplink NPUSCH transmissions in NB-IoT uplink slot n and NB-IoT uplink slot n+1 may associate with different time adjustments, the UE shall complete transmission of NB-IoT uplink slot n and not transmit the first Y' ms or Y' symbol(s) of NB-IoT uplink slot n+1. That is, the Y' time duration of uplink transmission being punctured is the first Y' ms or Y' symbol(s) of NB-IoT uplink slot n+1.

Because the potential overlapping symbol may be unknown to the eNB, the parameter Y' (i.e. the Y' time duration of uplink transmission being punctured) should be preconfigured.

When the Y' time duration of uplink transmission being punctured replaces the insertion of the NTN transmission gap (Y), each of the first to the fifth embodiments will be changed as follows.

For the first embodiment, for NPUSCH format 1 and NPUSCH format 2, after X continuous transmission, a data segment of the NPUSCH format 1 or format 2 transmission with Y' time duration is punctured, which means that first Y' time duration of NB-IoT uplink slot n+1 is not transmitted for the potential overlapping due to time adjustment (e.g. TA update), where slot n is the last slot in the X continuous transmission.

For the second embodiment, after an X' transmission duration determined by an X transmission duration that is predefined or configured by higher layer signaling and NB slot unit duration, a data segment of the NPUSCH transmission with Y' time duration is punctured, which means that first Y' time duration of NB-IoT uplink slot n+1 is not transmitted for the potential overlapping due to time adjustment (e.g. TA update), where slot n is the last slot in the X' transmission duration.

For the third embodiment, after X transmission time duration, a data segment of the NPUSCH transmission with Y' time duration is punctured. In addition, if a mapping to one NB slot cannot be finished within the X transmission time duration, a whole of the one NB slot will be postponed to be transmitted after the X transmission time duration, which means that a data segment of the postponed one NB slot with first Y' time duration is punctured.

For the fourth embodiment, after X valid time slot transmission, a data segment of the NPUSCH transmission with Y' time duration is punctured, which means that first Y' time duration of NB-IoT uplink slot X+1 is not transmitted for the potential overlapping due to time adjustment (e.g. TA update).

For the fifth embodiment, after X repetition number of uplink NPUSCH transmissions, a data segment of the NPUSCH transmission with Y' time duration is punctured, which means that first Y' time duration of NB-IoT uplink slot n+1 is not transmitted for the potential overlapping due to time adjustment (e.g. TA update), where slot n is the last slot in the X repetition number of uplink NPUSCH transmissions.

According to a seventh embodiment, X and Y can be determined by TA or TO drift rate, when an NTN transmission gap of Y time duration is inserted after X (or X' based on X) time transmission duration. For example, if TA drift rate is larger than 20 μs/s, X=128, Y=32 Ts; else X=64, Y=16 Ts.

According to an eighth embodiment, X can be determined by the parameter Z (identical repetition number of the uplink data) to facilitate symbol-level combining.

The parameter Z is used to indicate the number of consecutive $N_{slot}$ NB slots used for transmit the TB. When the TB is transmitted with repetitions, a cyclic repetition is used. First, one uplink TB will be mapped to $M*N_{slot}$ (M is an integer of 1 or more) NB slot(s). For subcarrier spacing of 3.75 kHz, $N_{slot}$=1; and for subcarrier spacing of 15 kHz, $N_{slot}$=2. After mapping to first $N_{slot}$ NB slot(s), the $N_{slot}$ NB slot(s) shall be repeated $$M_{identical}^{NPUSCH} - 1 = Z - 1$$

additional times, before continuing the mapping to next $N_{slot}$ NB slot(s).

In the example of subcarrier spacing of 3.75 kHz, a first part of one TB is mapped to a first one NB slot ($N_{slot}$=1) for transmission, and the first one NB slot will be repeatedly transmitted by Z–1 additional times (in other words, the first one NB slot is transmitted by a total of Z times). Afterwards, a second part of the one TB is mapped to a second one NB slot for transmission, and the second one NB slot will be repeatedly transmitted by Z–1 additional times (in other words, the second one NB slot is transmitted by a total of Z times). The same procedure continues until all mapped one-NB-slots are transmitted (depending on M, i.e. one TB is mapped to M one-NB-slots).

In the example of subcarrier spacing of 15 kHz, a first part of one TB is mapped to first two NB slots ($N_{slot}$=2) for transmission, and the first two NB slots will be repeatedly transmitted by Z–1 additional times (in other words, the first two NB slots are transmitted by a total of Z times). Afterwards, a second part of the one TB is mapped to second two NB slots for transmission, and the second two NB slots will be repeatedly transmitted by Z–1 additional times (in other words, the second two NB slots are transmitted by a total of Z times). The same procedure continues until all mapped two-NB-slots are transmitted (depending on M, i.e. one TB is mapped to M two-NB-slots).

Figure 10:
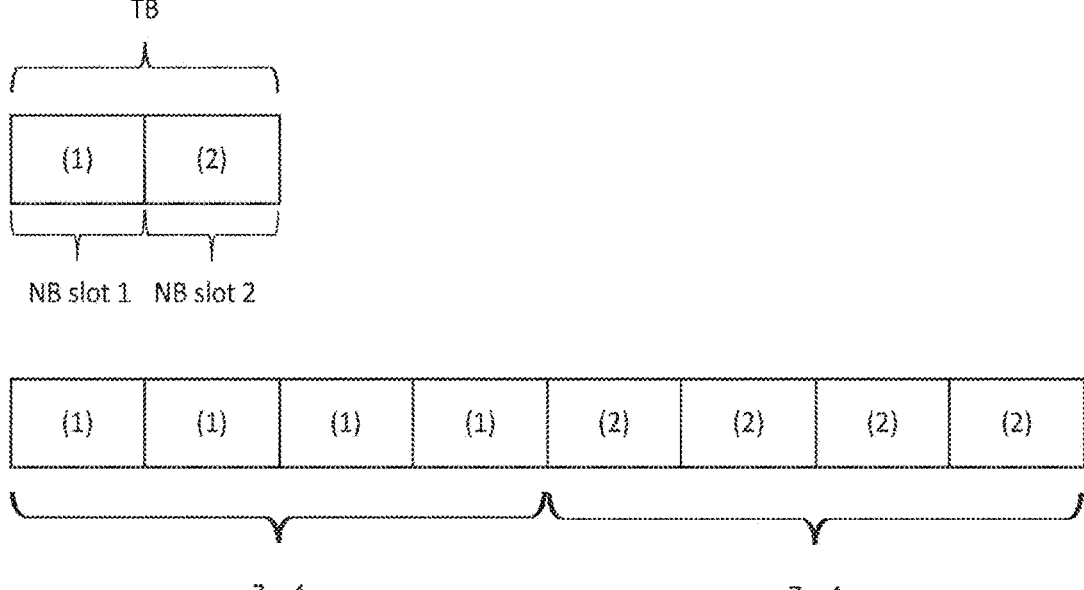
FIG. 10 illustrates an example of identical repetition number (Z) of the uplink data.

FIG. 10 illustrates an example for subcarrier spacing of 3.75 kHz, in which one uplink TB (which consists of a first part and a second part) will be mapped to 2*1=2 NB slots (M=2, $N_{slot}$=1) (NB slot 1 and NB slot 2), and Z=4. As shown in FIG. 10, the first part of the TB is mapped to NB slot 1, and the second part of the TB is mapped to NB slot 2. NB slot 1 is transmitted before it is additionally repeatedly transmitted by 3 (=Z–1=4–1) times (i.e. the first part of the TB is transmitted by Z=4 times). Afterwards, NB slot 2 is transmitted before it is additionally repeatedly transmitted by 3 (=Z–1=4–1) times (i.e. the second part of the TB is transmitted by Z=4 times).

Z is a preconfigured number depending on different scenarios. For CE Mode A, Z=1. For CE Mode B, Z=4 for FDD; and Z=5 for TDD. For NBIoT, Z=4 for multiple carriers, and Z=1 for single carrier.

As a whole, according to the eighth embodiment, X can be determined by the identical repetition number of the uplink data (Z).

According to a ninth embodiment, X can be determined based on different NTN deployment scenarios. For example, if GEO is used in NTN, X=128, else (e.g. LEO is used in NTN), X=64.

According to a tenth embodiment, the above-described embodiments, especially the first to the sixth embodiments can be combined.

Figure 11:
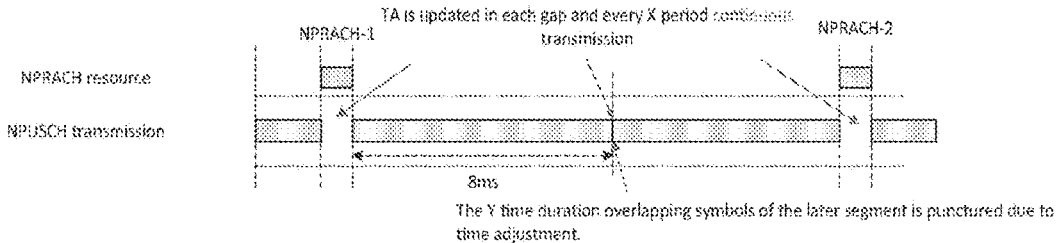
FIG. 11 illustrates a first example of the tenth embodiment.

In a first example of the tenth embodiment shown in FIG. 11, time adjustment (e.g. TA update) and frequency adjustment are performed in other gaps (e.g. invalid subframe(s) and NPRACH resource, only NPRACH resources (NPRACH-1 and NPRACH-2) are shown in FIG. 11) (for example, according to the first embodiment), while time adjustment (e.g. TA update) is also performed in Y' time duration of uplink transmission being punctured (for example, according to the sixth embodiment). For example, the Y' time duration overlapping symbols of the later segment is punctured due to time adjustment. In the first example of the tenth embodiment, TA is updated (i.e. time adjustment is performed) in each gap (invalid subframe(s) or NPRACH resource) and every X continuous transmission.

Figure 12:
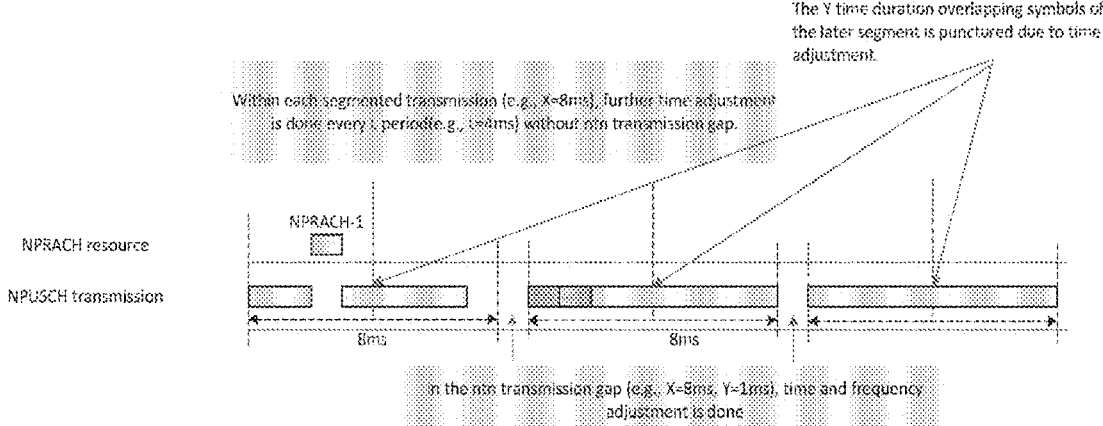
FIG. 12 illustrates a second example of the tenth embodiment.

In a second example of the tenth embodiment shown in FIG. 12, time adjustment (e.g. TA update) and frequency adjustment are performed in the inserted NTN transmission gap (Y) (for example, according to the third embodiment). In addition, within each segmented uplink transmission, time adjustment (e.g. TA update) is also performed every L period during which no other gaps (e.g. invalid subframe(s) and NPRACH resource) are present, e.g. by puncturing Y' time duration of uplink transmission. In the example of FIG. 12, X is 8 ms, Y is 1 ms, L is 4 ms within each 8 ms segmented uplink transmission.

According to an eleventh embodiment, for eMTC PUSCH and PUCCH transmissions, if frequency hopping is enabled, TA is updated in every X subframes, X is determined by frequency hopping interval $Y_{CH}$ and/or a scaling factor.

Figure 13:
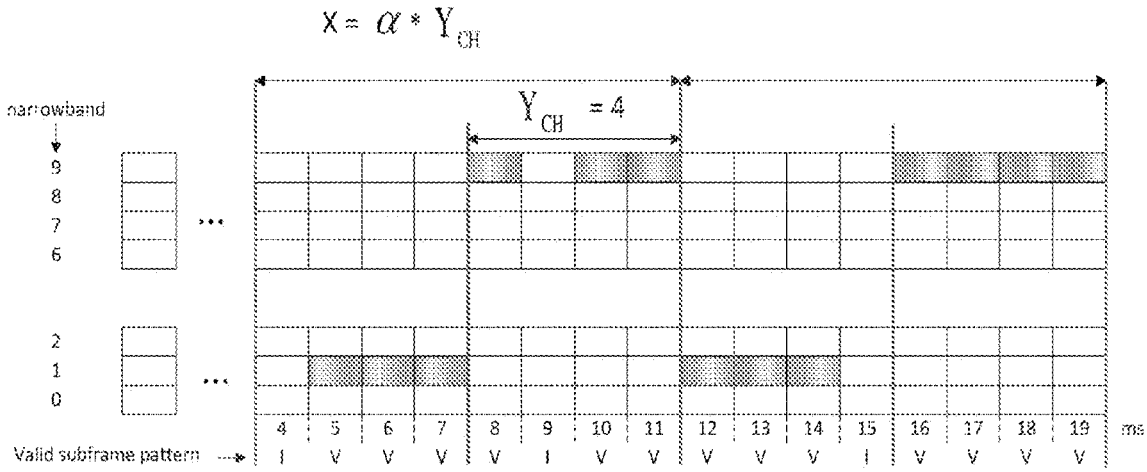
FIG. 13 illustrates an example of the eleventh embodiment

As shown in FIG. 13, a frequency hopping is done every $Y_{CH}=4$ ms. Time adjustment and frequency adjustment can be done every X=8 ms when the frequency hopping is configured. Accordingly, X can be configured as a scaling factor $\alpha=2$, which results $X=\alpha*Y_{CH}=2*4$ ms=8 ms. Alternatively, X can be configured as being equal to the frequency hopping interval $Y_{CH}$ (i.e. 4 ms). In this condition, no further configuration is necessary.

Figure 14:
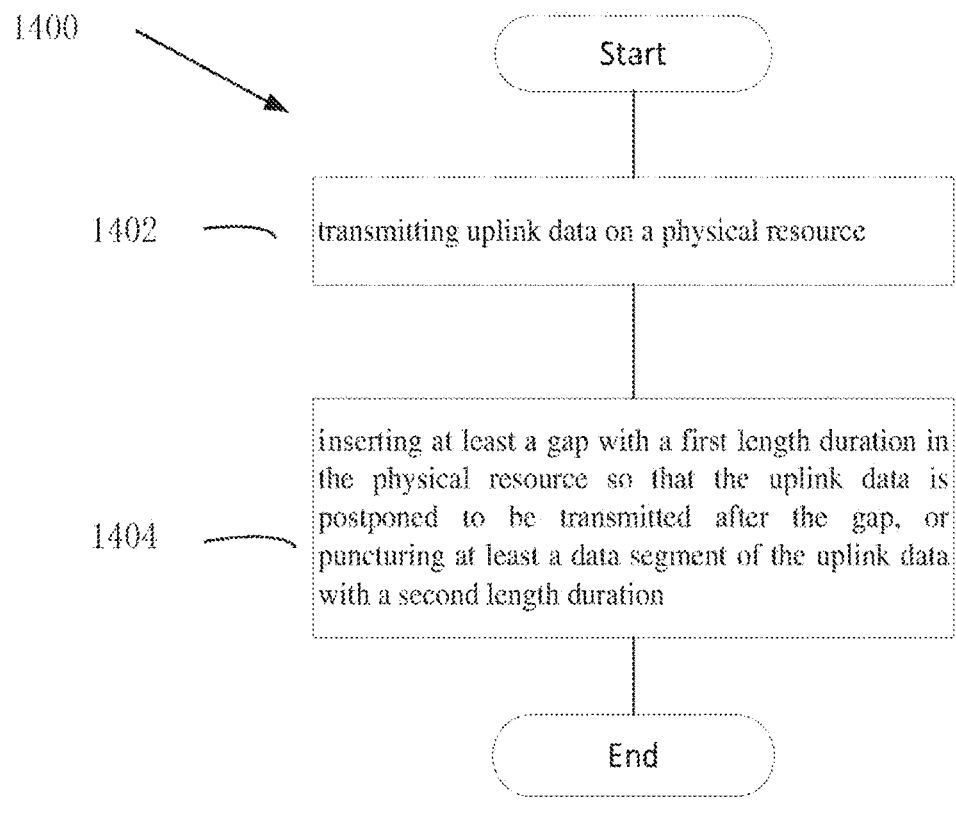
FIG. 14 is a schematic flow chart diagram illustrating an embodiment of a method.

FIG. 14 is a schematic flow chart diagram illustrating an embodiment of a method 1400 according to the present application. In some embodiments, the method 1400 is performed by an apparatus, such as a remote unit. In certain embodiments, the method 1400 may be performed by a processor executing program code, for example, a microcontroller, a microprocessor, a CPU, a GPU, an auxiliary processing unit, a FPGA, or the like.

The method 1400 may comprise 1402 transmitting uplink data on a physical resource, and 1404 inserting at least a gap with a first length duration in the physical resource so that the uplink data is postponed to be transmitted after the gap, or puncturing at least a data segment of the uplink data with a second length duration.

In step 1404, at least a gap is inserted in the physical resource or at least a data segment is punctured. Alternatively, at least a gap is inserted in the physical resource and at least a data segment is punctured. For example, as illustrated in FIG. 12, NTN transmission gap(s) are inserted every 8 ms and a data segment is punctured within each segmented transmission.

In some embodiment, the gap is inserted and/or the data segment is punctured after at least one of: a third length duration of continuous uplink data transmission; a length duration determined by slot unit duration and a fourth length duration (which can be minimum integer times of slot unit duration no smaller than the fourth length duration); a fifth length duration of uplink data transmission; a sixth number of slot unit duration; and a seventh repetition number of uplink data transmission. In some embodiment, the first length duration, the second length duration, the third length duration, the fourth length duration, the fifth length duration, the sixth number or the seventh repetition number is determined by at least one of: a time offset drift rate; an identical repetition number of uplink data; an NTN deployment scenario; and a frequency hopping interval and/or a scaling factor.

In some embodiment, a whole slot unit of the uplink data is postponed to be transmitted after the gap in the condition that the slot unit of the uplink data would be segmented by the gap. From another point of view, a whole slot unit of the uplink data is postponed to be transmitted after the gap in the condition that the starting transmission of the slot unit of the uplink data is in a last uplink subframe before the gap.

In one embodiment, a gap timer is associated with the first length duration, the gap timer restarts when uplink data restarts after any uplink data transmission suspending or after the gap.

In another embodiment, both time adjustment and frequency adjustment are performed in the gap. In some embodiment, time adjustment is performed in the data segment of the uplink data with the second length duration being punctured.

Figure 15:
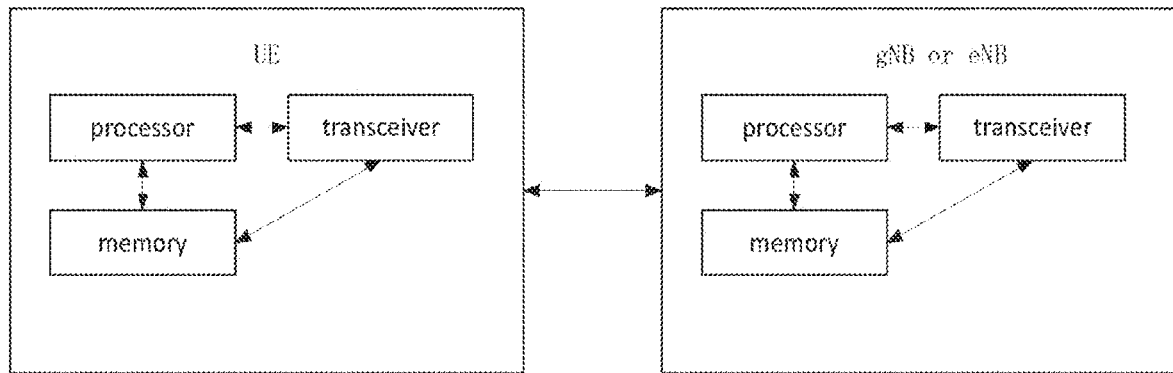
FIG. 15 is a schematic block diagram illustrating apparatuses according to one embodiment.

FIG. 15 is a schematic block diagram illustrating apparatuses according to one embodiment.

Referring to FIG. 15, the UE (i.e. the remote unit) includes a processor, a memory, and a transceiver. The processor implements a function, a process, and/or a method which are proposed in FIG. 14. The eNB or gNB (i.e. base unit) includes a processor, a memory, and a transceiver. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

In particular, a remote unit comprises a transmitter that transmits uplink data on a physical resource; and a processor that postpones the transmission of the uplink data by at least a gap with a first length duration or punctures at least a data segment of the uplink data with a second length duration.

The processor postpones the transmission of the uplink data by at least a gap or punctures at least a data segment. Alternatively, the processor postpones the transmission of the uplink data by at least a gap and punctures at least a data segment.

In some embodiment, the gap is inserted and/or the data segment is punctured after at least one of: a third length duration of continuous uplink data transmission; a length duration determined by slot unit duration and a fourth length duration (which can be minimum integer times of slot unit duration no smaller than the fourth length duration); a fifth length duration of uplink data transmission; a sixth number of slot unit duration; and a seventh repetition number of uplink data transmission. In some embodiment, the first length duration, the second length duration, the third length duration, the fourth length duration, the fifth length duration, the sixth number or the seventh repetition number is determined by at least one of: a time offset drift rate; an identical repetition number of uplink data; an NTN deployment scenario; and a frequency hopping interval and/or a scaling factor.

In some embodiment, a whole slot unit of the uplink data is postponed to be transmitted after the gap in the condition that the slot unit of the uplink data would be segmented by the gap. From another point of view, a whole slot unit of the uplink data is postponed to be transmitted after the gap in the condition that the starting transmission of the slot unit of the uplink data is in a last uplink subframe before the gap.

In one embodiment, a gap timer is associated with the first length duration, the gap timer restarts when uplink data restarts after any uplink data transmission suspending or after the gap.

In another embodiment, both time adjustment and frequency adjustment are performed in the gap. In some embodiment, time adjustment is performed in the data segment of the uplink data with the second length duration being punctured.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
transmitting uplink data on a physical resource, wherein after a first length duration of continuous uplink data transmission, a data segment of the uplink data with a second length duration is punctured or not transmitted in the physical resource, and wherein the first length duration is configured by a higher layer with a time slot unit or a physical resource unit, and wherein the second length duration is configured as a unit of a symbol, a time slot, or a mini-second.

2. The method of claim 1, further comprising:
inserting a gap with a third length duration in the physical resource so that the uplink data is postponed for transmission after the gap, wherein the gap is inserted after a length duration determined by a slot unit duration and a fourth length duration.

3. The method of claim 2, wherein the length duration determined by the slot unit duration and the fourth length duration is minimum integer times of the slot unit duration no smaller than the fourth length duration.

4. The method of claim 2, wherein a whole slot unit of the uplink data is postponed for transmission after the gap based on the whole slot unit of the uplink data would be segmented by the gap.

5. The method of claim 2, wherein a whole slot unit of the uplink data is postponed for transmission after the gap based on starting transmission of the whole slot unit of the uplink data is in a last uplink subframe before the gap.

6. The method of claim 2, wherein a gap timer is associated with the third length duration, the gap timer restarts when the uplink data restarts after any uplink data transmission suspending or after the gap.

7. The method of claim 2, wherein at least one of the third length duration, or the second length duration is determined by at least one of:
a time offset drift rate;
an identical repetition number of the uplink data;
a non-terrestrial network (NTN) deployment scenario; or
at least one of a frequency hopping interval or a scaling factor.

8. The method of claim 2, wherein both time adjustment and frequency adjustment are performed in the gap.

9. The method of claim 1, wherein time adjustment is performed in the data segment of the uplink data with the second length duration being punctured.

10. A user equipment (UE) for wireless communication, comprising:
at least one memory; and
at least one processor coupled with the at least one memory and configured to cause the UE to:
transmit uplink data on a physical resource, wherein, after a first length duration of continuous uplink data transmission, a data segment of the uplink data with a second length duration is punctured or not transmitted in the physical resource, and wherein the first length duration is configured by a higher layer with a time slot unit or a physical resource unit, and wherein the second length duration is configured as a unit of a symbol, a time slot, or a mini-second.

11. The UE of claim 10, wherein the at least one processor is configured to cause the UE to insert a gap with a third length duration in the physical resource, and postpone transmission of the uplink data after the gap.

12. The UE of claim 11, wherein a whole slot unit of the uplink data is postponed for transmission after the gap based on the whole slot unit of the uplink data would be segmented by the gap.

13. The UE of claim 11, wherein a whole slot unit of the uplink data is postponed for transmission after the gap based on starting transmission of the whole slot unit of the uplink data is in a last uplink subframe before the gap.

14. The UE of claim 11, wherein a gap timer is associated with the third length duration, the gap timer restarts when the uplink data restarts after any uplink data transmission suspending or after the gap.

15. The UE of claim 11, wherein time adjustment and frequency adjustment are performed in the gap.

16. A processor for wireless communication, comprising:
at least one controller coupled with at least one memory and configured to cause the processor to:
transmit uplink data on a physical resource, wherein, after a first length duration of continuous uplink data transmission, a data segment of the uplink data with a second length duration is punctured or not transmitted in the physical resource, and wherein the first length duration is configured by a higher layer with a time slot unit or a physical resource unit, and wherein the second length duration is configured as a unit of a symbol, a time slot, or a mini-second.

17. The processor of claim 16, wherein the at least one controller is configured to cause the processor to insert a gap with a third length duration in the physical resource, and postpone transmission of the uplink data after the gap.

18. The processor of claim 17, wherein a whole slot unit of the uplink data is postponed for transmission after the gap based on the whole slot unit of the uplink data would be segmented by the gap.

19. The processor of claim 17, wherein a whole slot unit of the uplink data is postponed for transmission after the gap based on starting transmission of the whole slot unit of the uplink data is in a last uplink subframe before the gap.

20. The processor of claim 17, wherein a gap timer is associated with the third length duration, the gap timer restarts when the uplink data restarts after any uplink data transmission suspending or after the gap.

* * * * *